Apr. 24, 1923.

C. HIRD

CHUCK

Filed Sept. 6, 1919

INVENTOR.
Charles Hird
BY
Rogers, Kennedy & Campbell
ATTORNEYS

Patented Apr. 24, 1923.

1,453,110

UNITED STATES PATENT OFFICE.

CHARLES HIRD, OF HARTFORD, CONNECTICUT, ASSIGNOR TO S. K. F. BALL BEARING COMPANY, A CORPORATION OF CONNECTICUT.

CHUCK.

Application filed September 6, 1919. Serial No. 322,006.

*To all whom it may concern:*

Be it known that I, CHARLES HIRD, a citizen of the United States, residing at Hartford, in the county of Hartford and State of Connecticut, have invented certain new and useful Improvements in Chucks, of which the following is a specification, reference being had therein to the accompanying drawing.

This invention relates to work holding chucks and has reference more particularly to the type of chuck having work holding jaws to hold the work and which is rotated to rotate the work, so that the latter may be subjected to grinding or other operations.

The chuck of the present invention is designed more particularly for holding annular or ring-like work pieces, such as the casing rings of anti-friction bearings, although it is applicable for handling other forms of work pieces; and the invention consists of improved means for operating the work holding jaws, preferably while the chuck is rotating, so that the work piece may be quickly released without first bringing the chuck to rest.

The invention consists also in the details of construction and combination of parts hereinafter described and claimed.

Referring to the drawings.

In the accompanying drawings.

Figure 1:
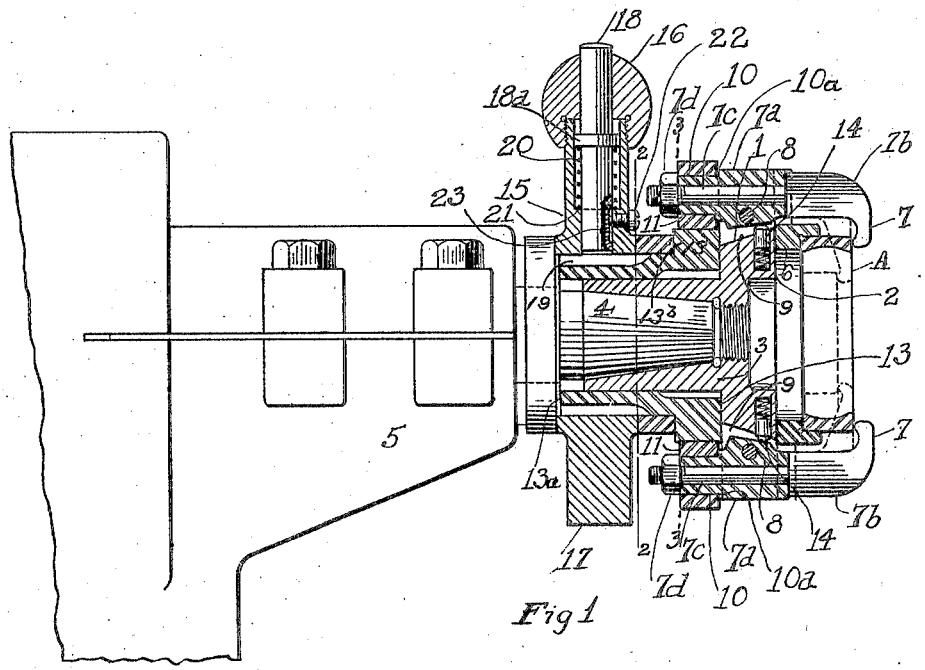
Fig. 1 is a longitudinal sectional view of my improved chuck on the line 1—1 of Fig. 2.
Figure 2:
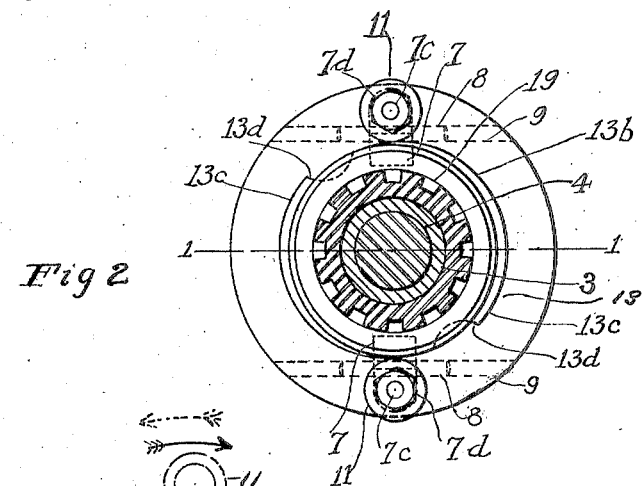
Fig. 2 is a cross section on the line 2—2 of Fig. 1.

1 designates a chuck body consisting of a disk-like head 2 and a hollow spindle 3 connected therewith and adapted to be fastened to a rotary driving member, such for instance, as the armature shaft 4 of a motor 5, so that the chuck will be rotated by the motor.

The head is provided with a work seat to receive the work. In the present instance, this work seat is in the form of a detachable plate 6 applied to the front face of the chuck head and formed with a circular open cavity in which the work A, in the present instance of annular form, seats and is held firmly in place by means of work holding jaws 7. In the particular form of the chuck illustrated, there are two work holding jaws disposed at diametrically opposite points on the chuck head and pivoted between their ends by means of pivot pins 8 in radial slots 9 in the outer edge of the head, the said jaws extending in the general direction of the axis of the chuck. Each of the jaws consists of a body portion $7^a$ through which the pivot pin passes, and a jaw proper $7^b$ extending forwardly from the body portion and turned inwardly at its extremity towards the center of the chuck and constituting a work clamping finger which overhangs the work piece on the work seat. As a result of the foregoing construction, when the jaws are rocked on their pivots, the clamping fingers will move in or out and will engage or disengage the work according to the direction of movement.

The jaw proper $7^b$ is detachably connected with the body portion $7^a$ by means of a stem $7^c$ connected with the jaw proper and extending rearwardly through the body portion, the rear projecting end of the stem being threaded to receive a confining nut $7^d$, which when screwed up against the rear end of the body portion, will secure the jaw proper firmly but detachably to the body portion. The purpose of this detachable connection of the jaw proper with the body portion is to enable other and different sized jaws to be substituted, to accommodate work pieces of different sizes as shown by the dotted lines in Fig. 1, it being understood that to accommodate such different sized work pieces, different work seat plates will be employed according to the diameter and thickness of the work piece.

At its rear end the body portion of the jaw is reduced in diameter to form a journal 10 and an annular shoulder $10^a$ at the forward end of the journal, and a roller 11 is loosely mounted on the journal and confined between the shoulder and the confining nut $7^d$ before alluded to. The rollers of the two jaws are acted on by a jaw actuating member 13 so formed and constructed that when moved in one position relatively to the chuck body, it will force the inner ends of the jaws outwardly and apply a clamping pressure thereto to cause the outer ends of the jaws to engage and hold the work on the seat, and when moved to another position, the inner ends of the jaws will be released from pressure and they will be permitted to move inwardly and release the work.

Figure 3:
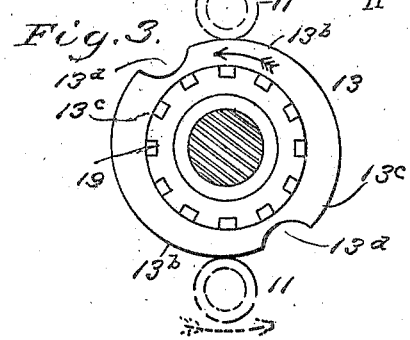
Fig. 3 is a sectional elevation on the line 3—3 of Fig. 1.

This jaw actuating member is in the form of a sleeve 13ª loosely surrounding the chuck spindle 3 and is provided on its forward end with an annular outwardly extending flange 13ᵇ whose peripheral edge is formed with two cam surfaces 13ᶜ and with two intervening cavities 13ᵈ, which cam surfaces and cavities co-operate with the rollers 11 on the jaws. The cam surfaces extend in curves which are eccentric to the axis of the sleeve, each cam surface extending from its lowest point at one end of one cavity, to its highest point at the adjacent end of the other cavity. As a result, when the sleeve and jaws are shifted relatively to each other circumferentially in the direction of the full line arrows in Fig. 3, the rollers on the jaws will ride up on the cam surfaces, and the jaws will be moved outwardly at their inner ends, and their outer ends will be caused to engage the work piece; and when the parts are moved relatively circumferentially in the opposite direction, the rollers will ride back towards the lower ends of the cam surfaces, thereby relieving the jaws of their clamping pressure, and finally the rollers will arrive opposite the respective cavities, whereupon they will be seated in the cavities by spring actuated plungers 14 mounted in guiding openings in the chuck head and bearing at their outer ends against the respective jaws at a point a short distance in front of their pivotal axes. In this action of the jaws, the outer clamping ends will be moved outwardly and away from the work and the latter will be released.

The relative movements of the cam sleeve and chuck head to effect the above described actions are effected and controlled in the present instance by means of a controlling device in the form of a frame 15 which loosely surrounds the inner end of the sleeve 13ª of the jaw actuating member, the said frame being provided at one side with an operating handle 16, and at the opposite side with a weighted portion 17, which latter acts to hold the frame with the handle in an upright position. The handle is formed with a guiding opening extending therethrough in which is mounted a plunger or bolt 18, the inner end of which is adapted to engage in any one of a number of notches 19 formed at intervals around the exterior of the sleeve 13ª, the outer end of the plunger extending through and being exposed at the outer end of the handle. The plunger is acted on by a spiral spring 20 encircling the plunger within the guide opening and bearing at its outer end against an annular shoulder 18ª on the plunger and bearing at its inner end against a shoulder 21 formed on the interior of the guiding opening, the movement of the plunger being limited by a screw 22 extending through the side of the handle and engaging at its inner end in a slot 23 in the side of the plunger. The spring thus tends to urge the plunger outwardly and maintain the inner end of the same free of the notches in the sleeve, but by grasping the handle and pressing against the exposed end of the plunger, its inner end may be engaged in one of the notches in the sleeve, thereby for the time being connecting the frame 15 operatively with the sleeve.

The operation of the parts is as follows:

With the chuck at rest and the rollers on the jaws seated in the cavities in the cam sleeve, the outer ends of the jaws will be held outwardly away from the work seat by the spring plungers 14. In this position of the parts, the frame 15 will be held with the handle in an upright position, and the plunger 18 will be held by its spring disengaged from the notches in the cam sleeve. The work piece is now set in place on the work seat, and the operator grasps the handle and presses the plunger in to engage its inner end with the cam sleeve, and he then swings the handle around. This action will turn the cam sleeve and cause the cam surfaces to ride against the rollers on the clamping jaws in the direction of the full line arrow in Fig. 3, and the jaws will be moved outwardly at their inner ends and inwardly at their outer ends, which latter will engage and clamp the work against its seat, the wedging action of the cam surfaces against the rollers, holding the jaws in firm engagement with the work. The operator now releases the plunger 18, whereupon it will be thrust outwardly by its spring and disengaged from the cam sleeve, and the handle being released by the operator, the frame will be turned back by the weighted portion thereof and the handle brought to an upright position. The motor is now set in operation to rotate the chuck, and when the operation on the work is completed and it is desired to release the work piece to permit a new one to be substituted, the driving power for the motor is cut off, and as it slows down, the operator again grasps the handle and thrusts the plunger inwardly in engagement with the cam sleeve, and the operator holding onto the handle, the rotation of the cam sleeve will be arrested. The chuck head, however, continues its motion by momentum and carries the clamping jaws around in the direction of the dotted arrows in Fig. 3, whereby the rollers on the jaws will be relieved of the pressure of the cam surfaces and they will finally arrive opposite the cavities 13ᵈ, whereupon the spring plungers 14 acting on the jaws will rock them on their pivots and cause the rollers to seat in the cavities, in which action the outer ends of the jaws will be swung outwardly and disengaged from the work piece, and the latter will be released.

In the operation of the device above described, the jaws are operated to release the work without first bringing the chuck to rest, thereby effecting a quick release; but the invention is not confined to the operation in this manner, as the cam sleeve may be shifted by the handle to operate the jaws to release the work, after the chuck has come to a full stop, the rotation of the cam sleeve in one direction relatively to the chuck head acting to move the inner ends of the clamping jaws outwardly, and the rotation of the cam sleeve in the opposite direction acting to relieve the cam jaws of clamping pressure and permitting the same to be moved by the spring plungers 14 to release the work.

In the foregoing description and accompanying drawings, I have set forth my invention in the particular detailed form which I prefer to adopt and which in practice has been found to answer to a satisfactory degree the ends to be attained. It is manifest, however, that these details may be variously changed and modified without departing from the limits of the invention, and it will be understood that the invention is not limited to any particular form or construction of the parts, except in so far as such limitations are specified in the claims.

Having thus described my invention, what I claim is:

1. In a chuck, the combination of a rotary body provided with a work seat, a work clamping jaw pivoted between its ends on said body to move radially at its inner end in clamping and releasing the work at its outer end, a jaw actuating member movable circumferentially relatively to the body and provided with a peripheral cam so formed that when the actuating member is moved circumferentially in one direction the cam will engage and positively move the inner end of the jaw radially outward and cause its outer end to positively clamp the work, and when moved in the opposite direction the cam will relieve the inner end of the jaw and permit its outer end to release the work, a controlling device for the jaw actuating member in relation to which said member is freely rotatable with the chuck body, and means for releasably engaging the controlling device with the jaw actuating member at will.

2. In a chuck, the combination of a rotary body provided with a work seat, a work clamping jaw pivoted between its ends on the body to move radially at its inner end in clamping and releasing the work at its outer end, a jaw actuating member movable circumferentially relatively to the body and provided with a peripheral cam surface and with a cavity associated with the end of said cam surface, the cam surface being so formed that when the actuating member is moved circumferentially in one direction the cam will engage and move the inner end of the jaw radially outward and will cause its outer end to clamp the work, and when moved in the opposite direction the cam will relieve the inner end of the jaw and permit said end to enter the cavity and be held thereby and release the work, a controlling device for the jaw actuating member in relation to which said member is freely rotatable with the chuck body, and means for releasably engaging the controlling device with the jaw actuating member at will.

3. In a chuck, the combination of a rotary body provided with a work seat, a work clamping jaw pivoted between its ends on said body to move radially at its inner end in clamping and releasing the work at its outer end, and a jaw actuating member movable circumferentially relatively to the body and provided with a peripheral cam so formed that when the actuating member is moved circumferentially in one direction, the cam will engage and positively move the inner end of the jaw radially outward and cause its outer end to positively clamp the work, and when moved in the opposite direction, the cam will relieve the inner end of the jaw and permit its outer end to release the work.

In testimony whereof, I have affixed my signature hereto.

CHARLES HIRD.